US 11,330,445 B1

(12) United States Patent
Tiwari et al.

(10) Patent No.: US 11,330,445 B1
(45) Date of Patent: *May 10, 2022

(54) ADAPTIVE SECTORING OF A WIRELESS BASE STATION

(71) Applicant: Meta Platforms, Inc., Menlo Park, CA (US)

(72) Inventors: Abhishek Tiwari, Oak Park, CA (US); Pratheep Bondalapati, Woodland Hills, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,510

(22) Filed: Oct. 9, 2020

Related U.S. Application Data (63) Continuation of application No. 16/364,035, filed on Mar. 25, 2019, now Pat. No. 10,848,984.

(51) Int. Cl.
 *H04W 16/28* (2009.01)
 *H04W 24/08* (2009.01)
 *H04W 88/08* (2009.01)

(52) U.S. Cl.
 CPC .......... *H04W 16/28* (2013.01); *H04W 24/08* (2013.01); *H04W 88/08* (2013.01)

(58) Field of Classification Search
 CPC ...... H04W 16/28; H04W 24/08; H04W 88/08
 See application file for complete search history.

(56) References Cited

U.S. PATENT DOCUMENTS

| 6,141,566 | A | 10/2000 | Gerdisch et al. |
| 6,353,600 | B1 | 3/2002 | Schwartz et al. |
| 6,397,062 | B1 | 5/2002 | Sessions |
| 6,888,512 | B1 | 5/2005 | Daigler |
| 8,774,837 | B2 | 7/2014 | Wright |
| 2001/0041595 | A1 | 11/2001 | Ikeda |
| 2004/0136342 | A1 | 7/2004 | Pedersen et al. |
| 2006/0084474 | A1 | 4/2006 | Iacono et al. |
| 2006/0141929 | A1 | 6/2006 | Lockie et al. |
| 2009/0285178 | A1 | 11/2009 | Chin et al. |
| 2013/0235807 | A1 | 9/2013 | Lee et al. |
| 2014/0003230 | A1 | 1/2014 | Mathur |
| 2016/0198348 | A1* | 7/2016 | Jover .................. H04K 3/228 455/452.1 |
| 2017/0117950 | A1* | 4/2017 | Strong ................ H04B 7/0452 |
| 2017/0331533 | A1* | 11/2017 | Strong ................ G01C 21/18 |
| 2018/0284217 | A1 | 10/2018 | Takeuchi |

* cited by examiner

*Primary Examiner* — Shukri Taha
(74) *Attorney, Agent, or Firm* — Brian R. Short

(57) ABSTRACT

Apparatuses, methods, and systems for adaptive sectoring of a wireless base station are disclosed. An apparatus includes a base station, wherein the base station includes a communication processing system operative to perform baseband processing of receive or transmit baseband signals. The base station further includes a plurality of antennas, wherein the plurality of antennas are connected to the communication processing system, wherein a plurality of subsets of the plurality of antennas operate to form a plurality of sectors, wherein each sector of each subset of the plurality of antennas is operative to cover a coverage area as determined by a beamforming pattern formed by a subset of the plurality of antennas of the sector, wherein the coverage area of one or more of the sectors is adaptively selected based on an existing cell site located within the coverage area of the one or more sectors.

20 Claims, 7 Drawing Sheets

Standard Base Station Cell Deployment

Super Cell Base Station Deployment

Standard Base Station Cell Deployment

Super Cell Base Station Deployment

Baseband processing, by a base station of a communication processing system, receive or transmit baseband signals
610

Forming, by a plurality of subsets of antennas connected to the communication processing system, a plurality of sectors, wherein each sector of each subset of the plurality of antennas is operative to cover a selectable coverage area as determined by a width of a beamforming pattern formed by the subset of the plurality of antennas of the sector, wherein the selectable coverage area of each of the sectors is adaptively selected based on a data demand at different locations within the coverage area.

ADAPTIVE SECTORING OF A WIRELESS BASE STATION

RELATED PATENT APPLICATIONS

This patent application is a continuation of U.S. patent application Ser. No. 16/364,035 filed Mar. 25, 2019, which is herein incorporated by reference.

FIELD OF THE DESCRIBED EMBODIMENTS

The described embodiments relate generally to wireless communications. More particularly, the described embodiments relate to systems, methods and apparatuses for adaptive sectoring of a cell of a wireless base station.

BACKGROUND

Large populations around the world lack access to mobile broadband coverage. Typically, these uncovered populations live in remote rural areas of the world characterized by sparse population density, rugged terrain, lack of proper electricity or road infrastructure, low average revenue per user, demand uncertainty due to lack of device access.

Conventional mobile networks typically place base stations on 30-40 meter standard height towers. Providing coverage to large rural regions through the conventional approaches requires several standard height towers and base stations. This makes conventional mobile network infrastructure deployment very costly. The combination of low coverage and high cost result in zero or negative return on investments for the network infrastructure owners and operators.

Taller base stations that provide larger cell coverage can provides a high-rate of return. As stated, the larger area of cell coverage and the larger capacity served by the taller base stations can make teller base stations more desirable. However, the larger cells need to be able to properly serve the large capacity.

It is desirable to have methods, apparatuses, and systems for adaptive sectoring of a wireless base station.

SUMMARY

An embodiment includes a base station. The base station includes a communication processing system operative to perform baseband processing on receive or transmit baseband signals. The base station further includes a plurality of antennas, wherein the plurality of antennas are connected to the communication processing system, wherein a plurality of subsets of the plurality of antennas operate to form a plurality of sectors, wherein each sector of each subset of the plurality of antennas is operative to cover a selectable coverage area as determined by a beamforming pattern formed by the subset of the plurality of antennas of the sector, wherein the selectable coverage area of one or more of the sectors is adaptively selected based on an existing cell site located within the selectable coverage area of the one or more sectors comprising adaptively null steering the beamforming pattern of the one or more sectors towards the location of the existing cell site that is deployed in the selectable coverage area of the one or more of the sectors.

Another embodiment includes a method. The method includes baseband processing, by a base station of a communication processing system, receiving or transmitting baseband signals, and forming, by a plurality of subsets of antennas connected to the communication processing system, a plurality of sectors, wherein each sector of each subset of the plurality of antennas is operative to cover a selectable coverage area as determined by a beamforming pattern formed by the subset of the plurality of antennas of the sector, wherein the selectable coverage area of one or more of the sectors is adaptively selected based on an existing cell site located within the selectable coverage area of the one or more sectors comprising adaptively null steering the beamforming pattern of the one or more sectors towards the location of the existing cell site that is deployed in the selectable coverage area of the one or more of the sectors.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for adaptive sectoring of a cell of a wireless base station. For at least some embodiments, the wireless base station includes a plurality of antennas, wherein the plurality of antennas are connected to the communication processing system, wherein a plurality of subsets of the plurality of antennas operate to form a plurality of sectors, wherein each sector of each subset of the plurality of antennas is operative to cover a selectable coverage area as determined by a width of a beamforming pattern formed by the subset of the plurality of antennas of the sector. Further, for an embodiment, the selectable coverage area of each of the sectors is adaptively selected based on a data demand at different locations within the coverage area. Further, for an embodiment, the selectable coverage area of each of the sectors is adaptively selected further based on a number of users located within the sector. Further, for an embodiment, the selectable coverage area of each of the sectors is adaptively selected further based on existing cells located within a coverage area of the plurality of antennas. Further, for an embodiment, the selectable coverage area of each of the sectors is adaptively selected further based on motion of the base station. Further, for an embodiment, the selectable coverage area of each of the sectors is adaptively selected further based on coordinated coverage between the base station and one or more neighboring base stations.

Figure 1:
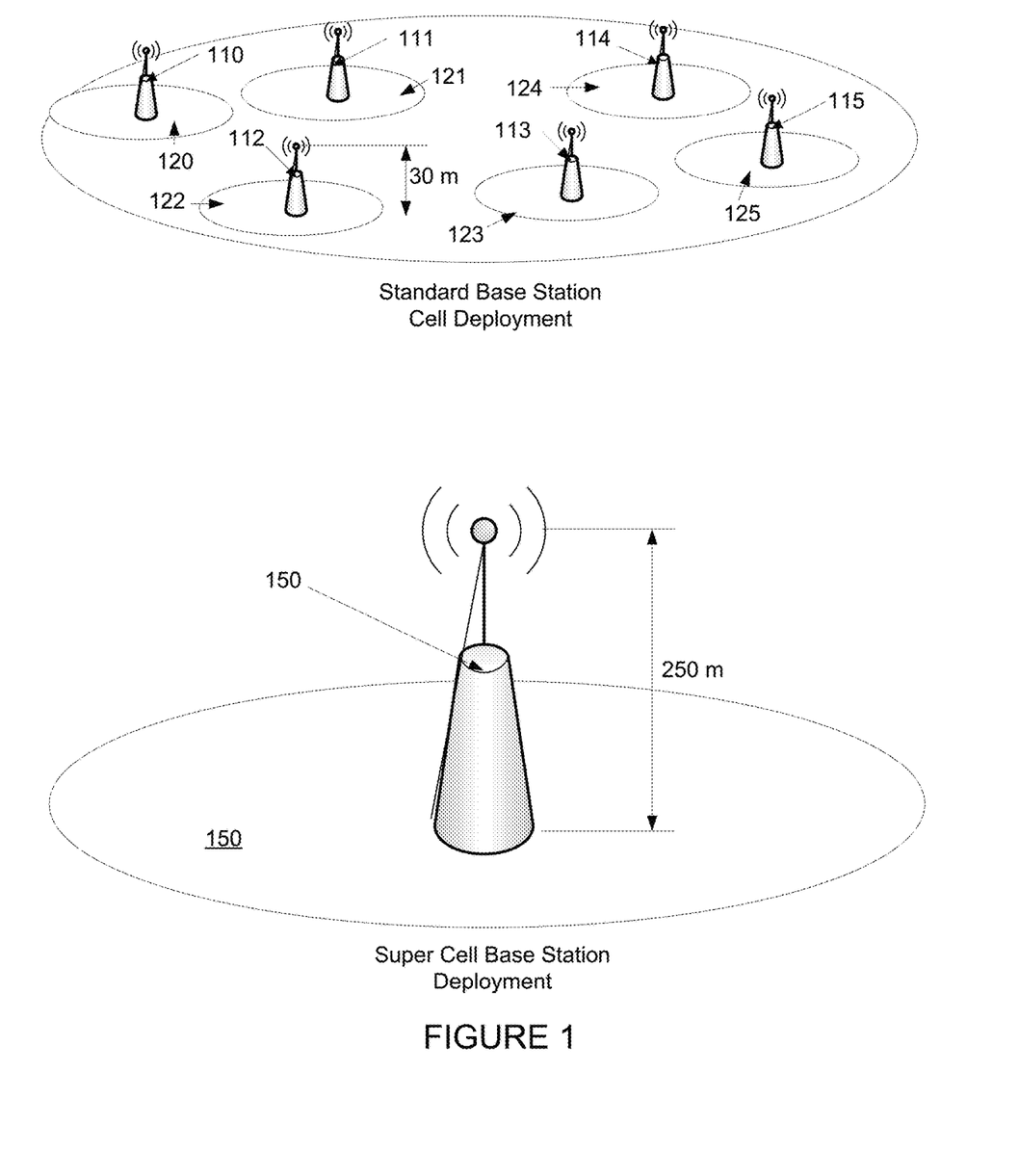
FIG. 1 shows a conventional base station tower and a supercell base station tower, according to an embodiment.

FIG. 1 shows conventional base station towers and a supercell base station tower, according to an embodiment. For an embodiment, the standard base stations 110, 111, 112, 113, 114, 115, have a height, and therefore, an antenna elevation of about 30-60 meters. Further, each of the standard base stations have a cell coverage area 120, 121, 122, 123, 124, 125.

FIG. 1 also shows a super cell base station tower 150 that has a coverage area 151. Elevating base stations to greater heights above ground provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand.

For greater capacity, the spectral efficiency of the elevated base station 250 is needed since available spectrum is unlikely to change. Techniques such as Massive MIMO (multiple-input, multiple-output), MU-MIMO (multi-user, MIMO) and high order sectorization have been used to improve spectral efficiency. However, the performance of Massive MIMO and MU-MIMO techniques depend greatly on having good quality channel state feedback available at the base station. To obtain the channel state information, channel state estimation preambles are transmitted without the beamforming gain of MU-MIMO through an omni-directional antenna. However, this means that the propagation range of the base station is fundamentally limited by the range of omni-directional transmission of channel state preambles. Further, the capacity gains of highly sectorized base stations are greatly diluted if the base station is mounted on a standard height tower. The dilution is due to local clutter around the tower which creates a large angular spread resulting in significant inter-sector interference between sectors.

Deployment of tall (supercell) base stations is advantageous because cellular propagation models predict ~6 dB (rule of thumb) lower path loss upon each doubling of base station height. Further, for an embodiment, as the base station height is increase, the clutter if angular spread of wireless signals decreases. The reduction in the amount of clutter of the angular spread of communication signals can make adaptive sectoring possible as oppose to short base station that typically suffer from too much cluster of the angular spread of communication signals to allow for adaptive sectoring.

For at least some embodiments, the tall base stations form super cells that are much larger than cells formed by standard cellular networks. For an embodiment, high-order sectoring can be provided by a Luneburg lens antenna array. Further, for an embodiment, the antenna array includes a high-power amplifier array. Further, base band processing of the base station can be located at a lower elevation than the antenna array of the base station, and communication signals and power can be provided to the antenna array through a fiber. Further, the described embodiments of sectorization can be waveform agnostic and allow the wireless base station to support wireless communication standards that do not utilize channel state information.

Figure 2:
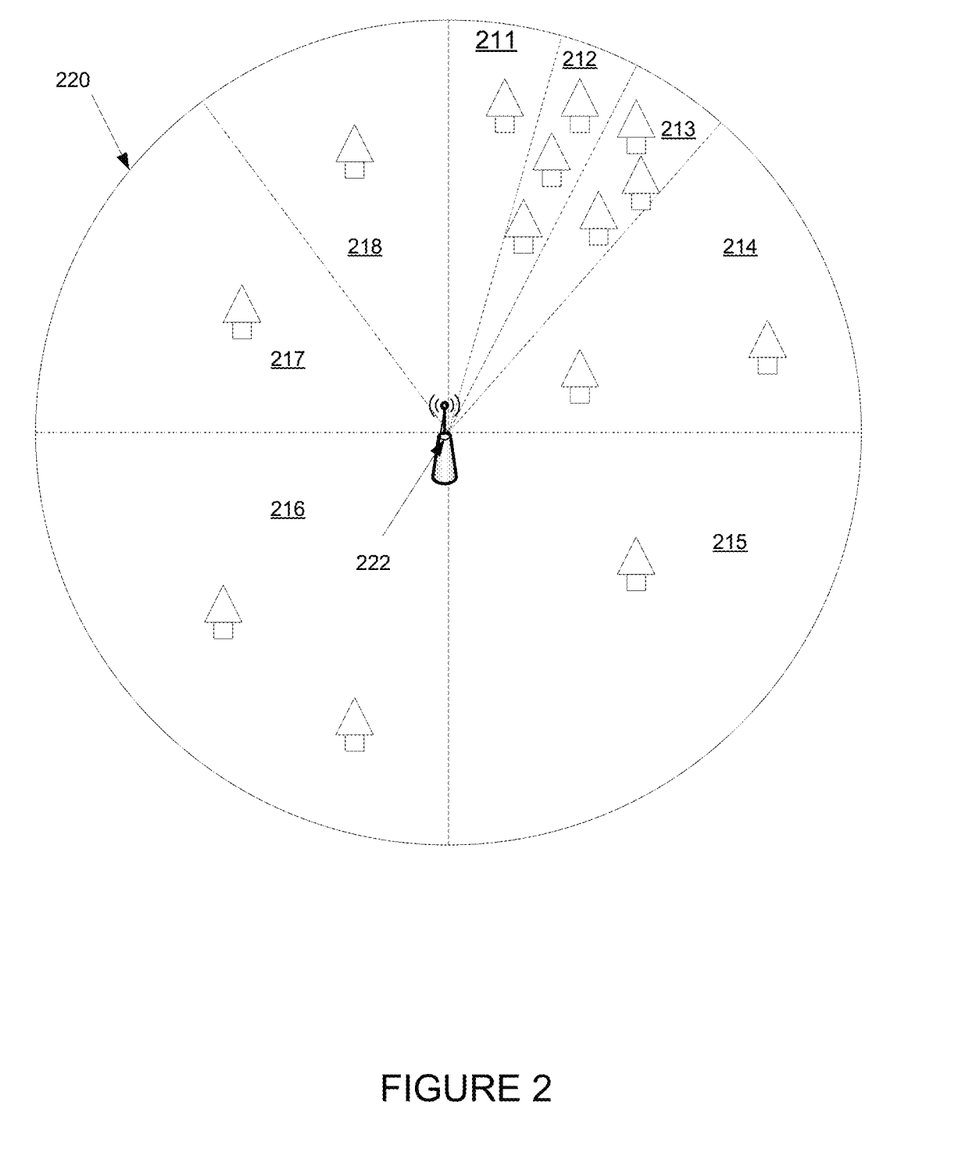
FIG. 2 shows a cell of a base station that includes adaptive sectoring, according to an embodiment.

FIG. 2 shows a cell of a base station that includes adaptive sectoring, according to an embodiment. As shown, the coverage area 210 of the base station is divided into sectors 211, 212, 213, 214, 215, 216, 217, 218 wherein each sector covers a section of the total coverage area 210 of cell of the base station 220. Generally, for an embodiment, each sector includes a radio and an array of antennas that operate to form a beam in which wireless signals can be transmitted and/or received from wireless devices. For an embodiment, the width of the beam is directly related to the coverage area of the sector.

For an embodiment, the coverage area of the different sectors varies. Further, for an embodiment, the coverage (or sectorization) of each of the sectors is adaptively adjusted over time. For an embodiment, the selectable coverage area of each of the sectors is adaptively selected based on monitoring of the data demand with respect to location over time. That is, for a given sector, the data being demanded (uplink or downlink) is monitored and the coverage area is accordingly adjusted. That is, the greater the data demand, the more focused or narrower the sector, to allow the sector to satisfy the data demand. For an embodiment, the data demand is estimated or determined at different locations (azimuth and elevation angles) within the coverage area of the cell (Supercell) formed by the base station. Supercell (check if defined earlier). After the adaptation of the sectors has been performed, the azimuth and elevation angles with higher data demand will have a greater number of narrow sectors. Further, the sectors with azimuth and elevation angles having a lower data demand will have fewer number of wider sectors serving them.

As previously described, in order to implement adaptive sectoring, the coverage area of the base station must be subjected to angular spread of wireless communication signals within the coverage area of less than a threshold amount. Taller base stations can be implemented that are above the clutter (that decreases the angular spread of wireless communication signals) within the coverage area, and therefore, can implement adaptive sectoring which is not implementable with shorter, standard cell base stations.

For an embodiment, the selectable coverage area of each of the sectors is adaptively selected further based on a number of users located within the sector. That is, in general, the number of users within a sector can be used as an indication of the data demand of the sectors. Further, for an embodiment, the selectable coverage area of each of the sectors is adaptively selected further based on monitored performance that indicates a refined estimate of the number of users located within the sector. That is, an estimate of the number of users within a sector can be improved by monitoring activity within the sector.

The adaptive sectoring of the described embodiments can provide for greater capacity of wireless communication by the base station. Inter-sector interference can operate to limit the capacity gains realized by adaptive sectoring, however, reusing of carrier frequencies across different sectors can increase the inter-sector interference. One way to reduce interference is by using different carrier frequencies in neighboring sectors. However, this comes at a cost of lower deliverable overall capacity. Tall towers of Supercell base stations provide lower observable angular spread than shorter base stations which reduces inter-sector interference and enables frequency reuse in all sectors and thus the overall capacity of Supercell is enhanced. Further, adaptive sectors include narrow sectors as facilitated by narrow sector beam widths that result in higher (additional) antenna gains which further improves coverage.

As described, for at least some embodiments, the coverage areas of the sectors can be adaptively selection based on data demand and numbers of users. That is, for example, sectors that adapts to a user population and a user data demand. For an embodiment, azimuth directions that experience more demand are served a large number of narrow sectors. For an embodiment, azimuth directions that have low demand are served by a small number of wide sectors. For an embodiment, as demand changes the sectorization allocations adapt to the demand changes based on network key performance indices.

Figure 3:
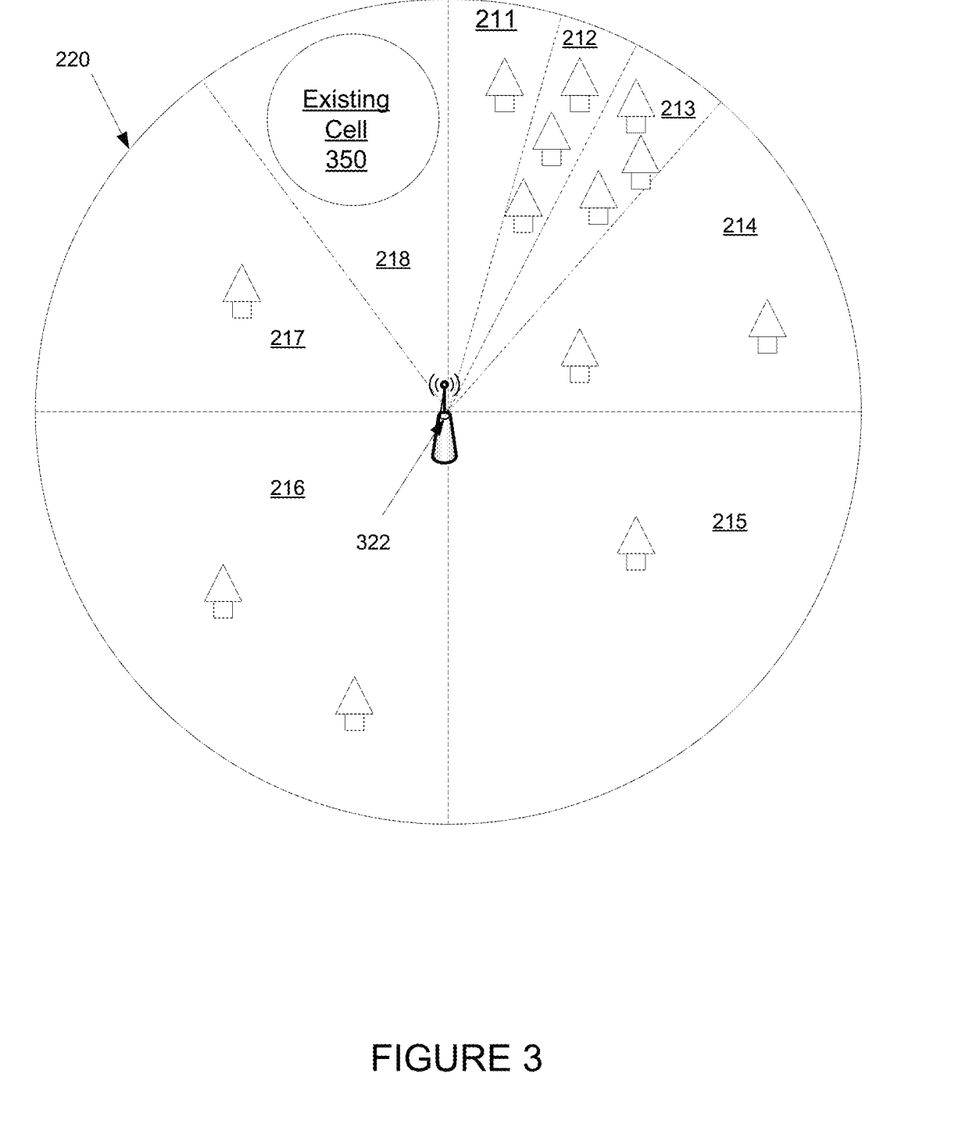
FIG. 3 shows a cell of a base station wherein sectoring is adaptively adjusted based on another cell, according to an embodiment.

FIG. 3 shows a cell of a base station wherein sectoring is adaptively adjusted based on another cell (for example, existing cell 350), according to an embodiment. That is, for an embodiment, the selectable coverage area of each of the sectors is adaptively selected further based on existing cells located within a coverage area of the plurality of antennas. For an embodiment, the existing cells (such as, existing cell 350) are determined priori through frequency spectrum coordination with the existing cells. Once identified, the sectorization of the base station can be adapted to account for the existence of the cells. For an embodiment, the adaptive sectorization includes adaptive null steering the beam of a sector towards existing cell sites that are deployed in the coverage region of cell of the base station. That is, the beam forming of a sector that has a coverage area that includes an existing cell is configured to null its beam where the existing cell 350 is located to minimize or reduce interference with the existing cell 350.

For an embodiment, a wireless user device transmits information to the base station that indicates the existence of the existing cells, and can provide an indication of the level of power of wireless signals received from the existing cells. Based on this information, the base station can determine whether to avoid or to aid the wireless user device. For an embodiment, the base station generates nulls in its beamforming patterns generated by the multiple antennas of the sector of the base station that covers the area of the existing cell. That is, the sector utilizes null steering towards the existing cell(s) to minimize interference caused by the base station to existing cells.

For at least some embodiments, the existing cells located within the coverage area of the plurality of antennas operate over at least an overlapping set of frequencies as the plurality of antennas. Therefore, the wireless communication of the base station can operate to interfere with the wireless communication occurring within the existing cell, and the wireless communication within the existing cell can operate to interfere with wireless communication of the base station. Accordingly, the sectorization of the base station is adaptively controlled to reduce the interference between the existing cell and the coverage area of the base station.

For at least some embodiments, power levels of the wireless communication within individual sectors can be controlled to mitigate interference with the existing cells. That is, for example, the power can be reduced to selectively mitigate interference with existing cells within a sector. Additionally, or alternatively, for an embodiment, beams of a sectors can be redirected (for example, down-tilting) to mitigate interference with an existing cell. Additionally, or alternatively, for an embodiment, inter-cell interferences (ICIC) can be utilized that includes coordinated scheduling in time and/or frequency to mitigate interference with an existing cell.

Figure 4:
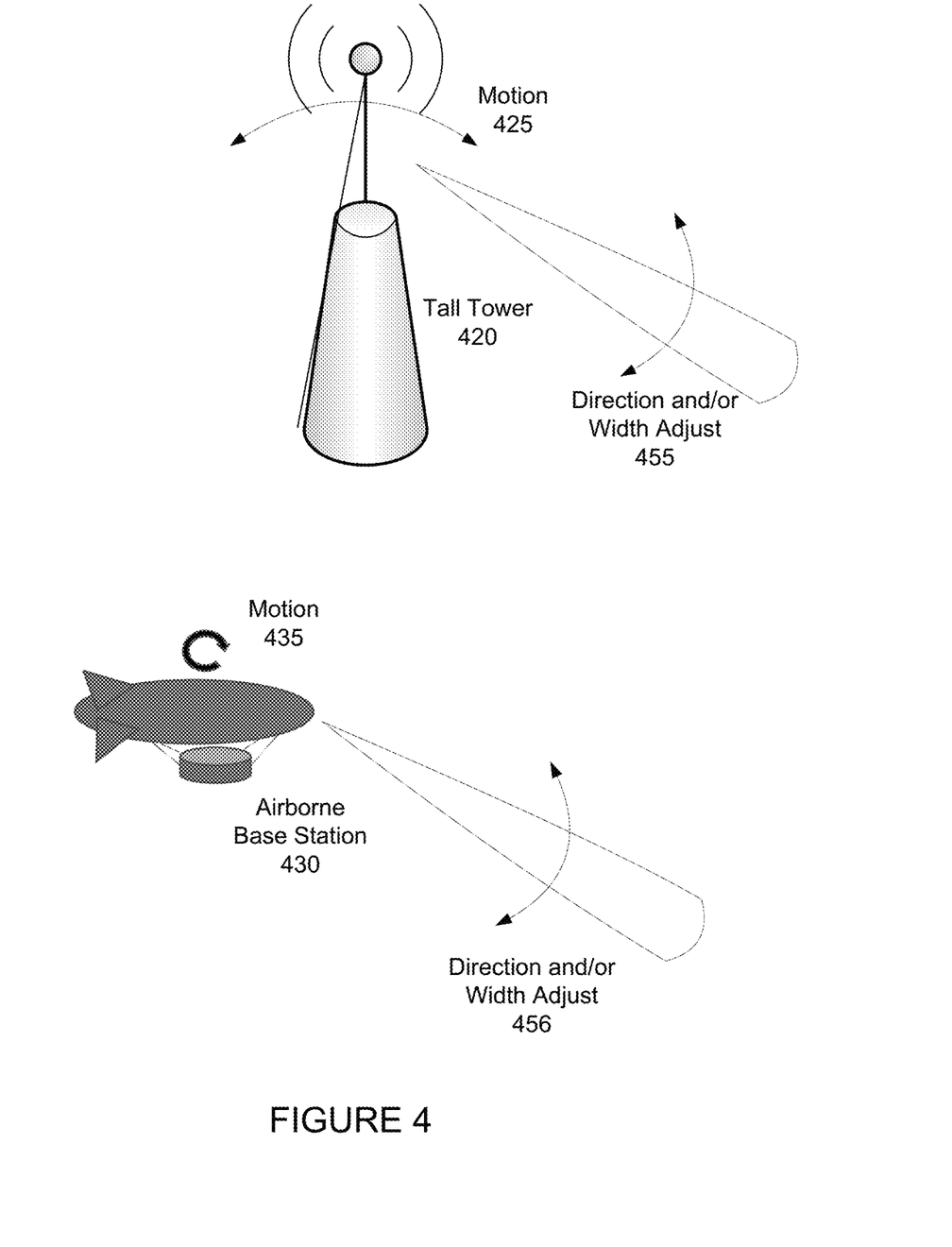
FIG. 4 shows a cell of a base station wherein sectoring is adaptively adjusted based on motion of the base station, according to an embodiment.

FIG. 4 shows a cell of a base station (425, 435) wherein sectoring is adaptively adjusted based on motion of the base station, according to an embodiment. For at least some embodiments, the base station (425, 435) the adaptive sectoring adjusts based on sensed twisting of and elevated platform. FIG. 4 shows two types of base station (425, 435) that may be susceptible to motion of the base stations. A first type of base station includes a tall tower 420 that is substantially taller than a typical cellular base station. A second type of base station includes an air-borne base station 430. As the sectors of an embodiment of the adaptive sectoring base station include beamforming 455, 456 by the multiple antennas of the sector, the beamforming 455, 456 includes a beam direction and a beam width. Motion of the base station can cause the direction of the beam to be perturbed. Accordingly, for an embodiment, a motion sensor attached or associated with the base station senses motion of the base station. For an embodiment, the sensed motion is used to adaptively update the sectoring of the base station to mitigate the effects of motion of the base station.

For at least some embodiments, excessive motion of the base station can trigger a handoff of a user from one sector to an adjacent sector. With many users, that can create a simultaneous handoff of many user simultaneously, which can create a network overload. The described embodiments that monitor motion of the base station and adapt the sectoring accordingly by adjusting a beam direction of the sector can reduce the possibility of a simultaneous handoff of many users from occurring.

Specifically, an embodiment further includes motion sensors for detecting motion of the base station, and further includes adjusting the beamforming pattern formed by the subset of the plurality of antennas of the sector based on the detected motion. For an embodiment, this includes adjusting a direction of a beam of the sector (in 2 or 3 dimensions) to undo the effects of the motion of an elevated platform of the base station. For an embodiment, this includes adjusting a beam width of the beam of the sector. For example, the width of the beam of the sector can be widened if the motion of the elevated platform of the base station is excessive (greater than a threshold).

Tall towered base stations and air borne base stations can sway, twist and bounce in case of high winds and gusts. The described embodiments that include an adaptive high order sectoring should ensure that the sector boundaries remain fixed in the presence of any such motion.

Figure 5:
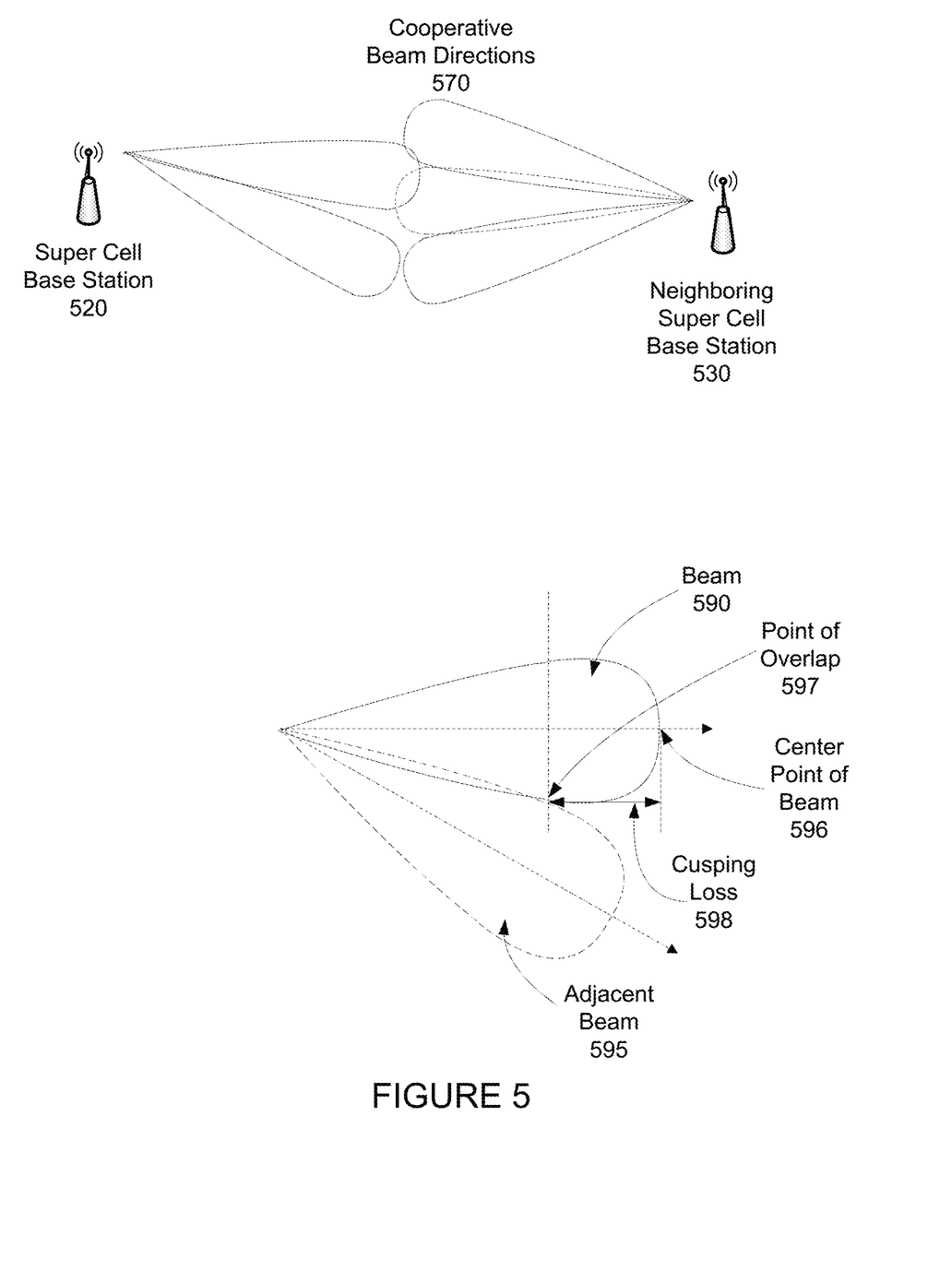
FIG. 5 shows a cell of a base station wherein sectoring is adaptively adjusted based on sectoring of a neighboring base station, according to an embodiment.

FIG. 5 shows a cell of a base station 520 wherein sectoring is adaptively adjusted based on sectoring of a neighboring base station 530, according to an embodiment. That is, for at least some embodiments, the selectable coverage area of each of the sectors is adaptively selected further based on coordinated coverage between the base station 520 and one or more neighboring base stations 530. For at least some embodiments, this includes directing centers of beams 570 of the sectors of the base station, and or manipulating width of the beams 570 to improve that coverage area of base station 520 in conjunction with the one or more neighboring base stations 530. This can include setting the directions of the beams of the coverage areas and setting the beam widths to manipulate cusping loss.

FIG. 5 further shows a beam in which there is cusping of a beam 590. The cusping represents a signal power fall off as the beam 590 trails off from the center 596 of the beam 590 to the point of overlap 597 with the adjacent beam 595 as depicted by the cusping loss 598. For at least some embodiments, setting the beam directions of neighboring supercell base stations mitigates the effects of cusping loss, and mitigates the interference of neighboring base stations felt by the cell edge users. That is, for example, by offsetting the directions of the beams from the sectors of neighboring base stations, area between the beams can be adaptively covered by adapting the both the direction and the widths of the beam. For an embodiment, neighboring base stations coordinate their adaptive sectoring to ensure low interference at the cell edges. For an embodiment, the sectors of the base station and the neighboring base station fit as meshed gears resulting in better cell edge coverage and lower inter-SuperCell interference at the cell edge.

Waveform Agnostic

At least some embodiments of the base station do not require channel state information for supporting communication between the base station and the users. This can be advantageous because obtaining the channel state information requires measuring the channel state information. As previously described, the measurements can result in limiting the size of the cell coverage. Additionally, not requiring the channel state information for operation wireless communication of the base station allows the communication between the base station and the users to be waveform agnostic.

Figure 6:
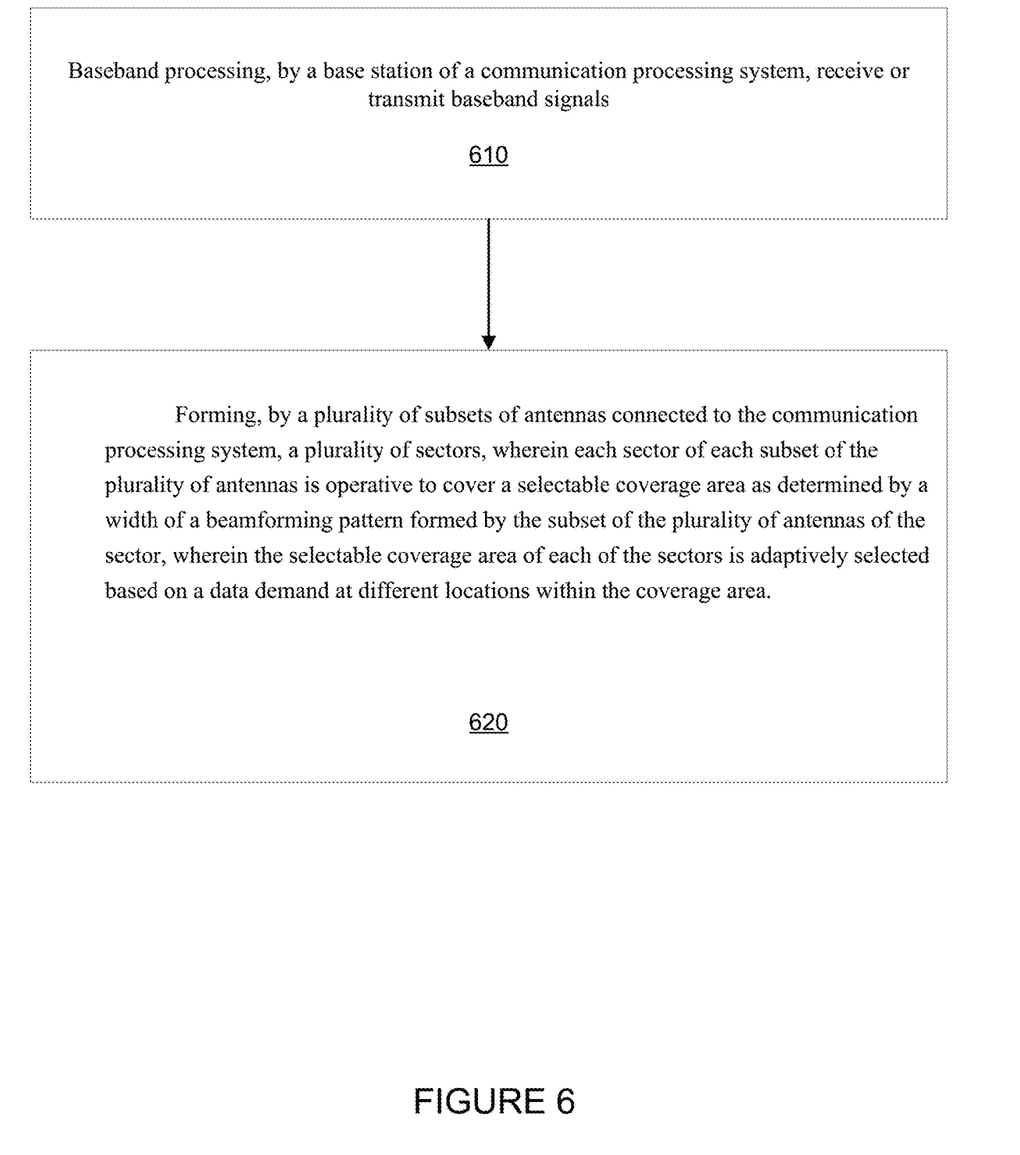
FIG. 6 is a flow chart that includes steps of a method of adaptive sectoring of a cell of a base station, according to an embodiment.

FIG. 6 is a flow chart that includes steps of a method of adaptive sectoring of a cell of a base station, according to an embodiment. A first step 610 includes baseband processing, by a base station of a communication processing system, receive or transmit baseband signals. A second step 620 includes forming, by a plurality of antennas (for example, on an elevated platform), a plurality of sectors, wherein each sector of each subset of the plurality of antennas is operative to cover a selectable coverage area as determined by a width of a beamforming pattern formed by a subset of the plurality of antennas of the sector, wherein the plurality of antennas are connected to the communication processing system, wherein a plurality of subsets of the plurality of antennas operate to form, wherein the selectable coverage area of each of the sectors is adaptively selected based on a number of users located within the sector.

For at least some embodiments, the selectable coverage area of each of the sectors is adaptively selected further based on monitoring of the data demand with respect to location over time. For at least some embodiments, the selectable coverage area of each of the sectors is adaptively selected further based on a number of users located within the sector.

For at least some embodiments, the selectable coverage area of each of the sectors is adaptively selected further based on existing cells located within a coverage area of the plurality of antennas. For at least some embodiments, the existing cells located within the coverage area of the plurality of antennas operate over at least an overlapping set of frequencies as the plurality of antennas.

For at least some embodiments, the selectable coverage area of each of the sectors is adaptively selected further based on motion of the base station. At least some embodiments further include motion sensors for detecting motion of the base station, and further include adjusting the beamforming pattern formed by the subset of the plurality of antennas of the sector based on the detected motion. For at least some embodiments, the adjusting includes adjusting the direction of the sector beams (in 3 dimensions) to undo the effects of the motion of the elevated platform. At least some embodiments include widening the sector beam width if the platform motion is excessive or above a motion threshold.

For at least some embodiments, the selectable coverage area of each of the sectors is adaptively selected further based on coordinated coverage between the base station and one or more neighboring base stations. At least some embodiments include directing the beam direction centers of each of the sectors are directed, and manipulating the widths of the sectors to improve coverage area of base station in conjunction with the one or more neighboring base stations. This can include setting the directions of the beams of the coverage areas and setting the beam widths to manipulate cusping loss. That is, at least some embodiments include setting the beam directions of neighboring supercell base stations to mitigate the effects of cusping loss, and mitigate the interference of neighboring base stations felt by the cell edge users.

Figure 7:
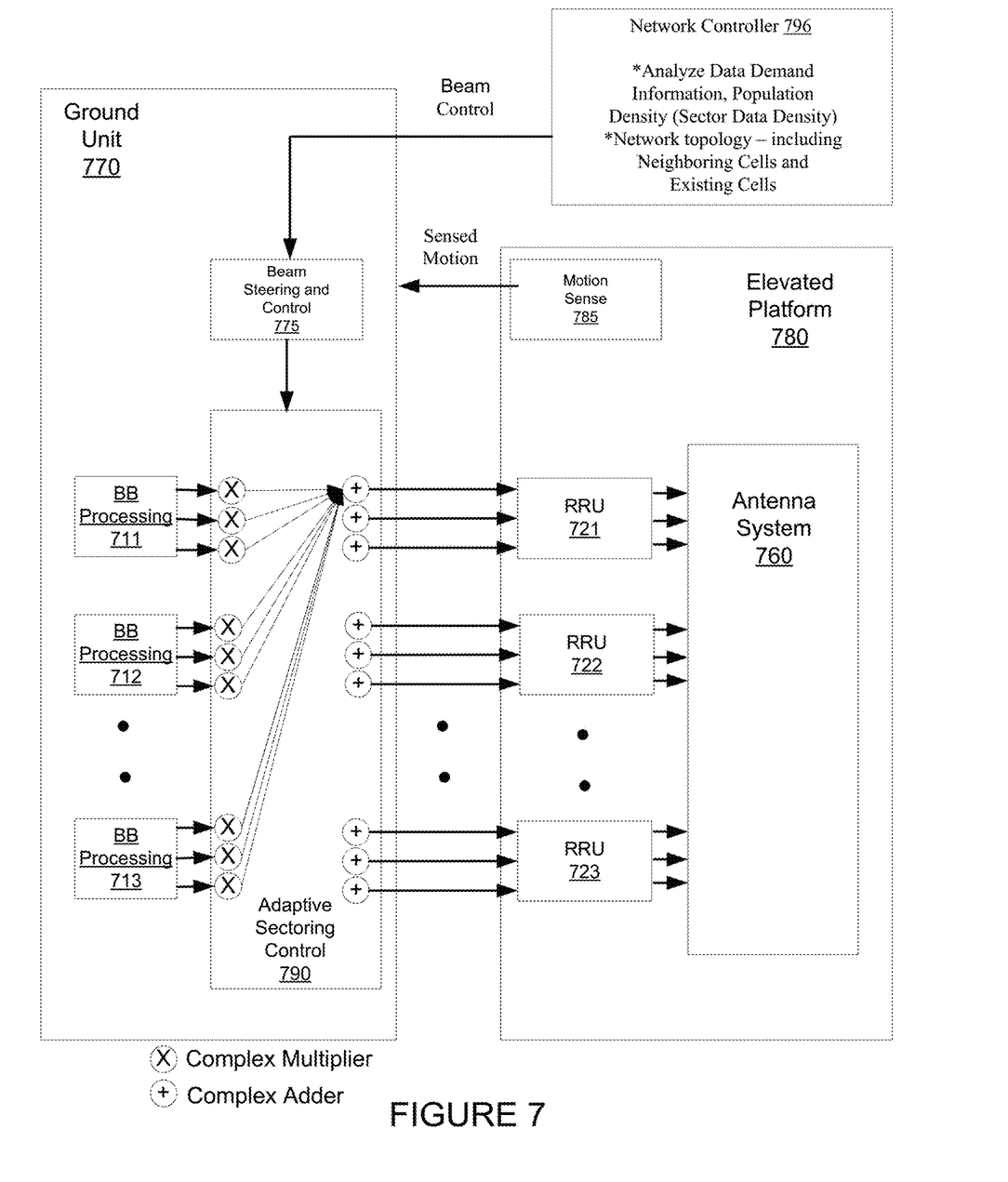
FIG. 7 shows architecture of a base station that includes an on ground portion and an elevated platform portion, according to an embodiment.

FIG. 7 shows an architecture of a base station that includes an on-ground portion (ground unit 770) and an elevated platform portion (elevated platform 780), according to an embodiment. As previously described, for at least some embodiments, elevating base stations well above the surrounding local clutter reduces the angular spread observed at the base stations. If the angular spread is maintain below a threshold, then the described embodiments of sectorizing the coverage area of the cell formed by a base station becomes an option which can be used to meet the capacity demands of the larger cell. Further, for at least some embodiments, the base station is adapted to handle heterogeneous demand in different angular sectors. That is, the data demand of the different sectors can be very different, and the sectors are adaptively adjusted to handle the varying demands of the different sectors. Further, for at least some embodiments, the base station adaptively evolves as the demand profile changes as a function of time.

For at least some embodiments, the base station (supercell base station) includes tall towers that include guide wireless to provide stability of the tall towers. For at least some embodiments, the base station (supercell base station) air borne tethered structures which elevate the base stations to greater heights above ground level. These embodiments of platforms can achieve base station elevations up to 200-500 meters at a reasonable cost. For at least some embodiments, these platforms are connected to the ground and rely on ground generated power to power the high-order sectoring elevated base station.

As shown, for an embodiment, the ground unit 770 includes a plurality base band processing units 711, 712, 713 that provide base band processing of transmit and receive signals.

Further, as shown, for an embodiment, the base band processing units 711, 712, 713 are connected to an adaptive sectoring control unit 790. For an embodiment, adaptive sectoring control unit 790 includes a plurality of complex multipliers and complex adders which delay, scale, and sum the communication signals for forming beams of different sectors of the base station. This includes setting the direction and/or the widths of beams for each of the sectors of the base station.

Further, as shown, for an embodiment, the adaptive sectoring control unit 790 receives control from a beam steering and control unit 775. The beam steering and control unit 775 provide adaptive adjustment of the adaptive sectoring control unit 790 to provide the adaptive sectoring of the base station. This includes setting the beam directions and beam widths of beams formed for each of the different sectors of the base station.

Further, as shown, for an embodiment, the beam steering and control unit 775 can receive one or more control inputs that enable the beam steering and control unit 775 to adaptively control the sectorization of the base station. Exemplary inputs include one or more of a sector data density input, an existing cell input, neighboring cell input, and/or motion sensed by a motion sensor 785 of the base station. As shown, for an embodiment, an external controller 796 provides a beam control for the beam steering and control unit 775. For an embodiment, the external controller 796 utilizes a network topology to at least partially control the sectorization of the base station by controlling the beam control of the beam steering and control unit 775 based on data demand and population density (sector data density), neighboring cells, and/or existing cells. That is, for an embodiment, the external controller 796 combines each of the sector data density, neighboring cells, and/or existing cells and generates the beam control. For an embodiment, the combination of the sector data density, neighboring cells, and/or existing cells are combined to provide the beam control. For an embodiment, the combination includes a weighted combination, in which the weighting can adapt over time. As the data density is detected to change, the weighting of the data density can correspondingly change. As the effects of neighboring cells and/or existing cells changes, the weighting of the neighboring cells and/or existing cells can be adaptively adjusted.

For an embodiment, the sectorization includes multiple remote radio units (RRUs) 721, 722, 723 to be used on the elevated platform 780 of the elevated base station. The RRUs 721, 722, 723 are connected to an antenna system 760 of the elevated platform 780

Although specific embodiments have been described and illustrated, the embodiments are not to be limited to the specific forms or arrangements of parts so described and illustrated. The described embodiments are to only be limited by the claims.

What is claimed is:

1. A base station, comprising:
   a communication processing system operating to perform baseband processing of receive or transmit baseband signals;
   a plurality of antennas, wherein the plurality of antennas are connected to the communication processing system, wherein a plurality of subsets of the plurality of antennas operating to form a plurality of sectors, wherein each subset comprises a sub-plurality of antennas;
   wherein each sector of each subset of the plurality of antennas is operating to cover a selectable coverage area as determined by a beamforming pattern formed by the subset of the plurality of antennas of the sector;
   wherein an existing cell site operates over at least an overlapping set of frequencies as the plurality of antennas, and wireless communication of the base station interferes with the wireless communication occurring within the existing cell site;
   wherein the selectable coverage area of one or more of the sectors is adaptively selected based on the existing cell site located within the selectable coverage area of the one or more sectors comprising adaptively null steering the beamforming pattern of the one or more sectors towards the location of the existing cell site that is deployed in the selectable coverage area of the one or more of the sectors to reduce interference with the existing cell site.

2. The base station of claim 1, wherein adaptively null steering the beamforming pattern of the one or more sectors towards the existing cell site that is deployed in the selectable coverage area of the one or more of the sectors comprises nulling the beamforming pattern where the existing cell site is located to minimize or reduce interference with the existing cell site.

3. The base station of claim 1, wherein the selectable coverage area of each of the sectors is adaptively selected further based on a number of users located within the sector.

4. The base station of claim 3, wherein the selectable coverage area of each of the sectors is adaptively selected further based on monitored performance that indicates a refined estimate of the number of users located within the sector.

5. The base station of claim 1, wherein the selectable coverage area of each of the sectors is adaptively selected further based on motion of the base station.

6. The base station of claim 5, further comprising motion sensors for detecting motion of the base station, and further comprising adjusting the beamforming pattern formed by the subset of the plurality of antennas of the sector based on the detected motion.

7. The base station of claim 1, wherein the selectable coverage area of each of the sectors is adaptively selected further based on a data demand at different locations within the coverage area, wherein a greater the data demand, a narrower a width of the beamforming pattern of the selectable coverage area of the sector, allowing the sector to satisfy the data demand.

8. The base station of claim 1, wherein the selectable coverage area of each of the sectors is adaptively selected further based on coordinated coverage between the base station and one or more neighboring base stations.

9. The base station of claim 1, wherein the base station does not require channel state information for supporting communication between the base station and the users.

10. The base station of claim 9, wherein the communication between the base station and the users is waveform agnostic.

11. A method, comprising:
    baseband processing, by a base station of a communication processing system, receive or transmit baseband signals;
    forming, by a plurality of subsets of antennas connected to the communication processing system, a plurality of sectors, wherein each sector of each subset of the plurality of antennas comprises a sub-plurality of antennas;
    covering a selectable coverage area as determined by a beamforming pattern formed by the subset of the plurality of antennas of the sector;
    wherein an existing cell site operates over at least an overlapping set of frequencies as the plurality of antennas, and wireless communication of the base station interferes with the wireless communication occurring within the existing cell site;
    wherein the selectable coverage area of one or more of the sectors is adaptively selected based on the existing cell site located within the selectable coverage area of the one or more sectors comprising adaptively null steering the beamforming pattern of the one or more sectors towards the location of the existing cell site that is deployed in the selectable coverage area of the one or more of the sectors to reduce interference with the existing cell site.

12. The method of claim 11, wherein adaptively null steering the beamforming pattern of the one or more sectors towards the existing cell site that is deployed in the selectable coverage area of the one or more of the sectors comprises nulling the beamforming pattern where the existing cell site is located to minimize or reduce interference with the existing cell site.

13. The method of claim 11, wherein the selectable coverage area of each of the sectors is adaptively selected further based on monitoring of the data demand with respect to location over time.

14. The method of claim 13, wherein the selectable coverage area of each of the sectors is adaptively selected further based on a data demand at different locations within the coverage area, wherein a greater the data demand, a narrower the width of the beamforming pattern of the selectable coverage area of the sector, allowing the sector to satisfy the data demand.

15. The method of claim 11, wherein the selectable coverage area of each of the sectors is adaptively selected further based on a number of users located within the sector.

16. The method of claim 11, wherein the selectable coverage area of each of the sectors is adaptively selected further based on motion of the base station.

17. The method of claim 16, further comprising detecting motion, by motion sensors, of the base station, and further comprising adjusting the beamforming pattern formed by the subset of the plurality of antennas of the sector based on the detected motion.

18. The method of claim 11, wherein the selectable coverage area of each of the sectors is adaptively selected further based on a data demand at different locations within the coverage area, wherein a greater the data demand, a narrower a width of the beamforming pattern of the selectable coverage area of the sector, allowing the sector to satisfy the data demand.

19. The method of claim 11, wherein the selectable coverage area of each of the sectors is adaptively selected further based on coordinated coverage between the base station and one or more neighboring base stations.

20. A base station, comprising:
a communication processing system operating to perform baseband processing of receive or transmit baseband signals;
a plurality of antennas, wherein the plurality of antennas are connected to the communication processing system, wherein a plurality of subsets of the plurality of antennas operating to form a plurality of sectors, wherein each sector of each subset of the plurality of antennas is operating to cover a selectable coverage area as determined by a beamforming pattern formed by the subset of the plurality of antennas of the sector;
wherein an existing cell site operates over at least an overlapping set of frequencies as the plurality of antennas, and wireless communication of the base station interferes with the wireless communication occurring within the existing cell site;
wherein the selectable coverage area of one or more of the sectors is adaptively selected based on the existing cell site located within the selectable coverage area of the one or more sectors comprising adaptively null steering the beamforming pattern of the one or more sectors towards the location of the existing cell site that is deployed in the selectable coverage area of the one or more of the sectors to reduce interference with the existing cell site.

* * * * *